United States Patent [19]
Siddiqui

[11] Patent Number: 5,908,481
[45] Date of Patent: Jun. 1, 1999

[54] INFLATOR FILTER COMPRISING CARBON YARN

[75] Inventor: Shahid A. Siddiqui, Farmington Hills, Mich.

[73] Assignee: Automotive Systems Laboratory, Inc., Farmington Hills, Mich.

[21] Appl. No.: 09/012,021

[22] Filed: Jan. 22, 1998

Related U.S. Application Data

[60] Provisional application No. 60/037,466, Feb. 6, 1997.

[51] Int. Cl.⁶ .................................................. B01D 46/00
[52] U.S. Cl. ................................ 55/485; 55/486; 55/487; 55/525; 55/527; 280/741; 422/167
[58] Field of Search ........................... 55/482, 486, 487, 55/485, 385.3, 525, 527, 528; 422/167, 305; 280/740, 741, 736

[56] References Cited

U.S. PATENT DOCUMENTS

| | | | |
|---|---|---|---|
| 4,017,100 | 4/1977 | Gehrig et al. ............................. | 55/487 |
| 4,322,385 | 3/1982 | Goetz ....................................... | 55/527 |
| 5,064,459 | 11/1991 | Unterforsthuber et al. .............. | 55/527 |
| 5,204,068 | 4/1993 | O'Loughlin et al. .................... | 55/527 |
| 5,215,721 | 6/1993 | Tasaki et al. ............................. | 55/487 |
| 5,230,726 | 7/1993 | Smith et al. .............................. | 55/487 |
| 5,268,013 | 12/1993 | Bruncher et al. ........................ | 55/486 |
| 5,308,370 | 5/1994 | Kraft et al. ............................... | 55/525 |
| 5,346,252 | 9/1994 | Levosinski ............................... | 55/487 |
| 5,447,105 | 9/1995 | Bauer et al. .............................. | 102/530 |
| 5,458,371 | 10/1995 | Fulmer et al. ............................ | 280/741 |
| 5,466,420 | 11/1995 | Parker et al. ............................. | 422/164 |
| 5,492,365 | 2/1996 | Bayley et al. ............................ | 280/741 |
| 5,562,303 | 10/1996 | Schleicher et al. ...................... | 280/736 |
| 5,609,360 | 3/1997 | Faigle et al. ............................. | 280/740 |
| 5,635,665 | 6/1997 | Kishi et al. ............................... | 55/527 |
| 5,665,131 | 9/1997 | Hock et al. ............................... | 55/525 |
| 5,702,494 | 12/1997 | Tompkins et al. ....................... | 55/486 |
| 5,816,612 | 10/1998 | Faigle et al. ............................. | 55/486 |

FOREIGN PATENT DOCUMENTS

| 2213404 | 8/1989 | United Kingdom ................. | 55/385.3 |
|---|---|---|---|

*Primary Examiner*—Duane S. Smith
*Attorney, Agent, or Firm*—Lyon, P.C.

[57] ABSTRACT

A solid propellant gas generator incorporates staged gas cooling and filtration so as to generate cool, clean gases having a composition suitable for use in an automobile airbag inflator. Carbon yarn is used as a lightweight primary heat sink within the filter thereby increasing the dimensional stability of the gas generator.

8 Claims, 2 Drawing Sheets

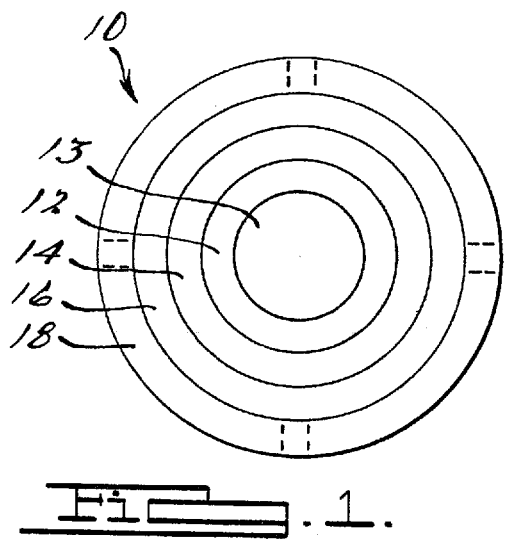
FIG. 1.
FIG. 3(a).
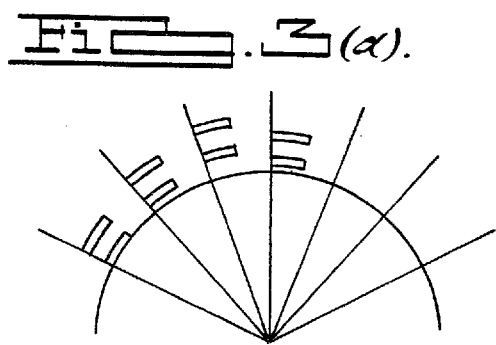
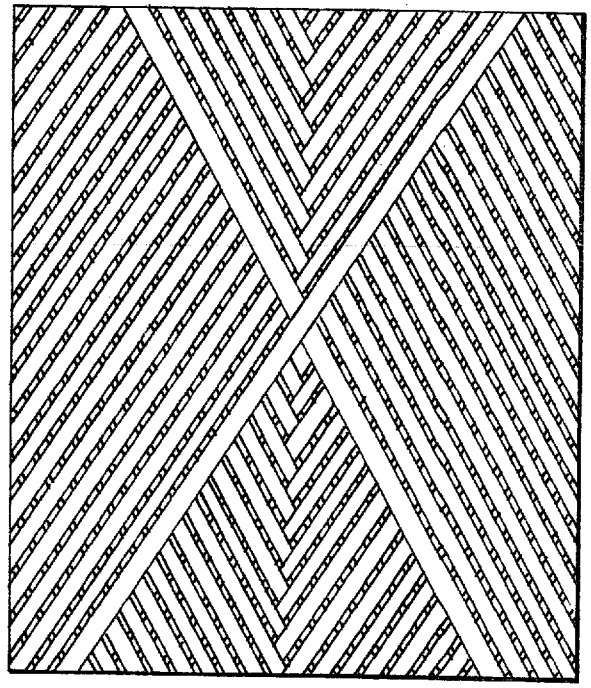
FIG. 2.
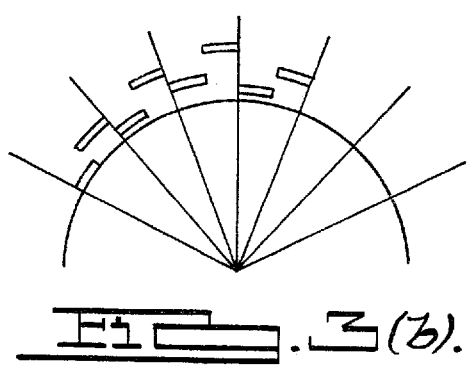
FIG. 3(b).
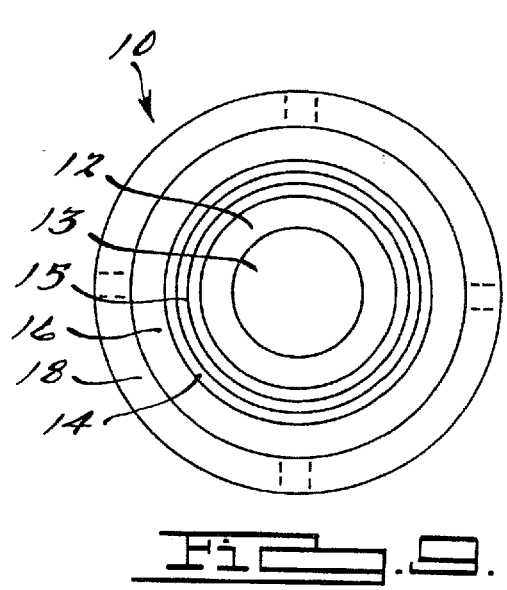
FIG. 9.

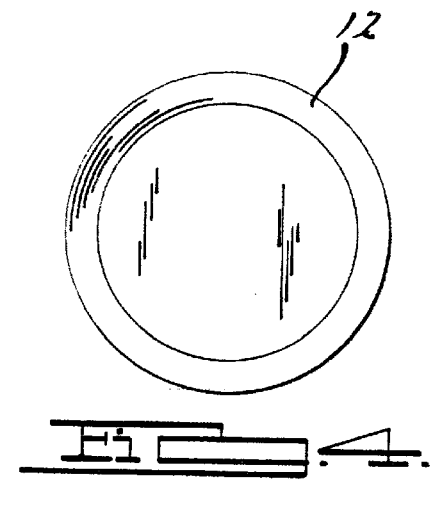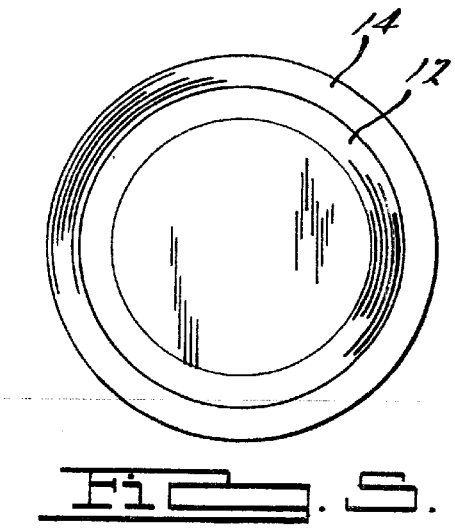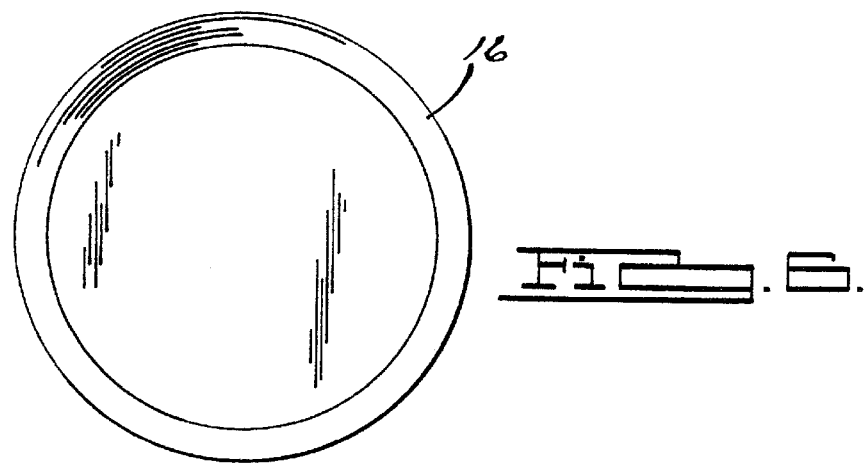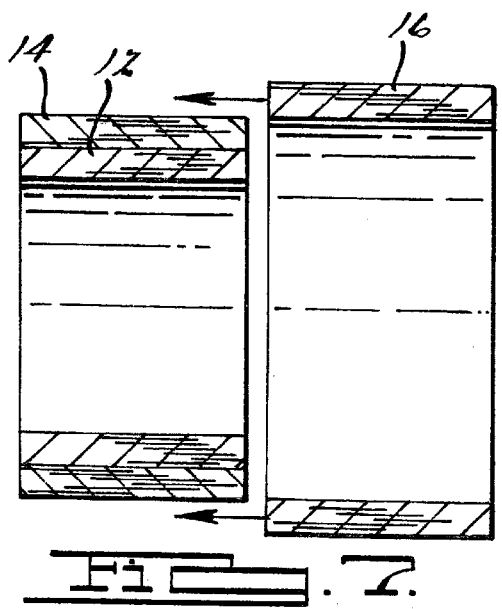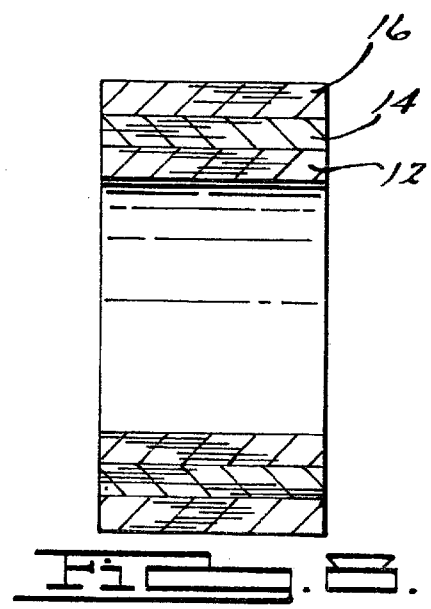

INFLATOR FILTER COMPRISING CARBON YARN

CROSS-REFERENCE TO RELATED APPLICATION

The present utility application claims the benefit of prior U.S. Provisional Application Serial No. 60/037,466, filed on Feb. 6, 1997, now abandoned.

BACKGROUND OF THE INVENTION

The present invention relates generally to gas inflators for automotive passenger restraint systems, and more specifically, to a gas filter for improved filtration of solids and cooling of combustion gases.

The composition of the gas stream emanating from an automobile airbag inflator is subject to strict requirements to avoid toxicity concerns. Generally, solid propellant gas generators produce unacceptable byproducts which must be removed from the gas stream prior to exiting the gas generator. Due to the high temperatures involved in burning solid propellants, many of the unacceptable byproducts are in the form of liquids or gases which are difficult to remove unless otherwise cooled to the point where the undesirable byproducts convert to solids, which can be filtered out, or to liquids, which solidify in contact with cool surfaces of the gas generator.

The conventional approach to solving the aforesaid problem has been to direct the hot propellant gases directly into a coolant/filter mass and rapidly cool the gases down in a single step to the point where the undesirable solid liquid byproducts are removed. However, a problem is presented by this approach in that rapid cooling of the gases may stabilize the gas combustion equilibrium in a manner that leads to unacceptably high levels of undesired gases.

For example, in airbag inflators, low levels of NO and CO in the effluent gases are mandated. When a stoichiometric propellant containing N, C and O is burned, the quantity of NO and CO produced is a function of the propellant combustion temperature. More CO and NO is formed at higher temperatures. If, as in a conventional system, the combustion gases are quenched in a single step to a temperature at which the gas reaction rates are reduced to essentially zero, combustion will not go to completion and unacceptably high CO and NO levels, resulting from the combustion temperature equilibrium condition, may be produced.

Multistage filters that cool the gases in stages have been designed to address the problems described. However, due to high temperatures, dimensional instability caused by burning and thermal shock is problematic with regard to current filtration designs.

For example, certain multistage cylindrical filters incorporate an expanded metal mesh as an outer filtration layer. The mesh is held in place by a longitudinally welded seam that creates a greater diameter across the filter when compared to other areas on the circumference. When the filter is inserted into a supporting housing or body, a critical radial annulus is required between the outer wall of the filter and the inner wall of the body, thereby ensuring uninterrupted egress of the gases through ports in the body. The connecting seam of the expanded metal mesh reduces the annular region between the seam and the body. Upon gas generant combustion, the heat causes the metal mesh to expand into the radial annulus, thereby further reducing the annular region between the seam and the housing. It has been found that when the area of the seam expands, it will often inhibit radial and circumferential gas flow at the expansion point and eliminate homogeneous gas flow through the filter. As known in the industry, this may result in "filter burn" and rupture of the filter at the point where the gases are unevenly forced out. In certain designs, this may further result in uneven inflation of the airbag and/or explosive potential due to pressure buildup.

Other multistage filters incorporate ceramic heat sinks. Ceramic is an excellent heat sink, however, ceramic must be handled with special equipment during manufacture and assembly. In addition, when heated upon propellant combustion, certain ceramic compositions have been found to liberate undesirable gases.

The weight of many of the materials used in certain multistage filters is yet another disadvantage. Heavyweight materials add to the weight of the airbag inflator as a whole, and also complicate handling during the manufacturing process.

SUMMARY OF THE INVENTION

Objects of the present invention are to provide a filter design which reduces the overall weight of the inflator assembly and is easy to manufacture, while increasing filter performance by providing consistent and uniform filtration, constant flow resistance at elevated temperatures, and a larger filter surface to improve heat transfer.

In accordance with these and other objects, the present invention provides a filter comprising a stack of three or more different layers of filter media formed from different respective materials. The filter comprises a novel array of expanded wire mesh, carbon yarn, and sintered stainless steel windings. These materials can be used in different combinations of layers. The filter design of the present invention significantly reduces the weight of the filter, and thus also reduces the overall weight of the inflator assembly.

BRIEF DESCRIPTION OF THE DRAWINGS

FIG. 1 is a cross-sectional view of a multistage filter having three filtration stages, in accordance with the present invention.

FIG. 2 illustrates the variable pitch, cross angle, and wound angle of stainless steel windings.

FIG. 3(a) illustrates the non-offset variety of stainless steel windings.

FIG. 3(b) illustrates the offset variety of stainless steel windings.

FIGS. 4–8 illustrate a method of assembly for the embodiment shown in FIG. 1.

FIG. 9 is a cross-sectional view of a multistage filter having four filtration stages, in accordance with the present invention.

DETAILED DESCRIPTION OF THE PREFERRED EMBODIMENT(S)

Referring to FIG. 1, there is shown in cross-section a multistage filter 10, housed within a conventional passenger restraint system (not shown). Filter 10 comprises an inner layer 12, an intermediate layer 14, an outer layer 16, and a housing 18. Inner layer 12 is preferably formed by winding a plurality of layers of stainless steel wire or flat strip ribbon on a mandrel, and then compressing and sintering the plurality of windings together to form a single layer assembly. As shown in FIGS. 2, 3(a) and 3(b), the winding process is controlled so as to adjust winding pitch, angle and off-set to provide different sizes and locations of openings throughout the surface area of layer 12. In addition, overall thickness of layer 12 is determined by the number of individual layers of wire or ribbon used during winding. By controlling the diameter, pitch, and cross angle of each metal ribbon or wire, the overall filtration capabilities of layer 12 can be selected as needed. The inner layer 12 additionally functions as a container housing propellant grains within propellant bed 13 prior to combustion, and further, operates as a structural member of the inflator.

As noted above, inner layer 12 is designed to have a desired specific open area, specific surface area and specific weight. Each individual wrap can be either offset as shown in FIG. 3(*a*) or non-offset as shown in FIG. 3(*b*) to regulate air flow passing through the inner layer. The density and porosity of the material is uniform through out the filter, and thus reduces heat transfer and gas flow variation, thereby adding to dimensional stability of the filter. The construction of inner layer 12 provides for increased surfaces throughout the layer to increase heat transfer capability. Stainless steel windings, as described herein, are obtainable from FUJI FILTER MFG. CO., LTD., Tokyo, Japan.

Alternatively, for greater heats of combustion, layer 12 may consist of welded expanded metal mesh/wire, obtainable from, for example, EXPAN, Inc., New Baltimore, Mich., whereby the thickness of the mesh and of the wire is varied as desired.

Intermediate layer 14 is formed by winding carbon yarn about the inner layer 12, and is also obtainable from FUJI FILTER MFG. CO. As with inner layer 12, the diameter, pitch, and cross angle of the carbon yarn can be adjusted during manufacture to achieve a desired filtration capability.

Since carbon yarn has a high specific heat and excellent heat retention, intermediate layer 14 operates as heat storage media. This material can withstand up to 6000° F. (i.e., 3,315° C.). The resistance to air flow is constant throughout the media at different temperatures, and thus, porosity of the material does not change with temperature. In contrast to conventionally used ceramic heat sinks, carbon yarn is lightweight and chemically inert. The density and porosity of the carbon yarn is uniform through out the filter, and thus reduces heat transfer and gas flow variation, thereby ensuring dimensional stability of the filter.

Outer layer 16 is formed from stainless steel in a manner similar to that described above for inner layer 12, except a finer wire or flat strip ribbon is wound and then placed about intermediate layer 14 to provide a smaller mesh size and capture finer combustion particulates. Outer layer 16 provides final cooling and structural support for the carbon yarn. In contrast to commonly used expanded metal mesh, the stainless steel layer is sintered and wound, not welded, and as such, there is no resulting seam that contributes to a reduction in the critical annular region between the filter and the housing. Nevertheless, if desired, outer layer 16 may also comprise expanded metal wire welded together at a seam.

FIGS. 4–8 illustrate the assembly of the embodiment shown in FIG. 1. As shown in FIGS. 4 and 5, after the inner layer 12 is wound on a mandrel, the carbon yarn layer 14 is wound around layer 12. As shown in FIG. 6, layer 16 is then wound around a second mandrel thereby forming an outer layer having an inner diameter approximately equal to the outer diameter of combined layers 12 and 14. FIGS. 7 and 8 illustrate how layer 16 simply slides over layer 14 to complete the finished filter.

As shown in FIG. 9, if additional filtration is desired, an additional metallic layer 15 of either expanded metal mesh or sintered stainless steel, may be disposed within the carbon yarn layer. Other layers may be added, if desired, and are manufactured and assembled in the same manner as shown in FIGS. 4–8.

In operation, upon combustion of the propellant, gases exiting from the propellant bed 13 radially and circumferentially flow through layer 12 to be filtered, and are substantially cooled and filtered as they next circumferentially and radially pass through the carbon yarn of layer 14. The gases then flow radially and circumferentially through layer 16 for final cooling and filtration, and thence through the filter housing 18, thereby inflating the airbag.

In accordance with the present invention, the simplified manufacturing process leaves no resultant seams that, upon combustion, often impinge upon the inner wall of the housing. Furthermore, because carbon yarn is inherently lightweight, the layer(s) of carbon yarn provide improved heat retention and yet do not significantly add to the weight of the inflator. As such, the combination of sintered stainless steel and carbon yarn increases filter performance by providing consistent and uniform filtration, constant flow resistance at elevated temperatures, and a larger filter surface to improve heat transfer.

While the preferred embodiment of the invention has been disclosed, it should be appreciated that the invention is susceptible of modification without departing from the scope of the following claims.

I claim:

1. A multistage filter for the inflator of an airbag passenger restraint system comprising a housing having a propellant bed disposed internally thereof, said filter comprising:

a permeable inner filtration stage in fluid communication with and disposed about said propellant bed;

a permeable intermediate filtration stage comprised of a plurality of carbon yarn layers in fluid communication with and extending about said inner filtration stage; and a permeable outer filtration stage in fluid communication with and extending about said intermediate filtration stage, whereby gases produced by combustion of said propellant flow through said inner filtration stage for cooling and filtration thereof, then into said carbon yarn for further cooling and filtration thereof, then through said outer filtration stage for final filtration and cooling, thence outwardly of said housing.

2. The filter of claim 1 further comprising:

a permeable fourth filtration stage annularly disposed within said carbon yarn.

3. The filter of claim 2 wherein said fourth filtration stage consists of expanded metal mesh.

4. The filter of claim 2 wherein said fourth filtration stage consists of wound stainless steel wire.

5. The filter of claim 1 wherein:

said inner and outer filtration stages are formed from a plurality of expanded metal layers.

6. The filter of claim 1 wherein:

said inner and outer filtration stages are formed from a plurality of stainless steel layers.

7. The filter of claim 1 wherein:

said inner filtration stage is formed from a plurality of stainless steel layers and said outer filtration stage is formed from expanded metal mesh.

8. The filter of claim 1 wherein:

said inner filtration stage is formed from expanded metal mesh, and said outer filtration stage is formed from a plurality of stainless steel layers.

* * * * *